United States Patent [19]

Rabin et al.

[11] Patent Number: 6,051,943
[45] Date of Patent: Apr. 18, 2000

[54] SERVO MOTOR CONTROLLER USING POSITION INTERPOLATION

[75] Inventors: Steve Rabin; Kirk D. Hanson; Mark W. Perona, all of San Diego, Calif.

[73] Assignee: Iomega Corporation, Roy, Utah

[21] Appl. No.: 08/917,401

[22] Filed: Aug. 25, 1997

Related U.S. Application Data

[63] Continuation of application No. 08/507,934, Jul. 24, 1995, abandoned, and a continuation of application No. 08/205,840, Mar. 3, 1994, abandoned.

[51] Int. Cl.$^7$ .................................................. H02K 23/00
[52] U.S. Cl. .......................... 318/254; 318/439; 318/603; 318/626
[58] Field of Search .................................. 318/254, 138, 318/439, 600–605, 685, 696, 569–573, 626, 362–382; 310/156, 67 R

[56] References Cited

U.S. PATENT DOCUMENTS

| | | | |
|---|---|---|---|
| 4,039,911 | 8/1977 | Tanikoshi | 318/254 |
| 4,051,420 | 9/1977 | Tanikoshi | 318/254 |
| 4,225,890 | 9/1980 | Takenaka et al. | 360/72.1 |
| 4,288,823 | 9/1981 | Yamamoto et al. | 360/73 |
| 4,355,255 | 10/1982 | Herr et al. | 310/254 |
| 4,507,590 | 3/1985 | Miyazaki | 318/254 |
| 4,549,104 | 10/1985 | Niimura et al. | 310/67 R |
| 4,567,391 | 1/1986 | Tucker et al. | 310/156 |
| 4,573,088 | 2/1986 | Kommoss | 360/71 |
| 4,622,499 | 11/1986 | Squires et al. | 318/254 |
| 4,626,751 | 12/1986 | Doeman | 318/254 |
| 4,645,991 | 2/1987 | Ban et al. | 318/254 |
| 4,734,603 | 3/1988 | von der Heide et al. | 310/72 |
| 4,773,025 | 9/1988 | Penkar et al. | 364/513 |
| 4,789,812 | 12/1988 | Nakamura | 318/254 X |
| 4,818,908 | 4/1989 | Tamae et al. | 310/171 |
| 4,832,576 | 5/1989 | Doguchi et al. | |
| 4,914,361 | 4/1990 | Tajima et al. | 318/254 |
| 5,250,881 | 10/1993 | Yochino | 318/254 |
| 5,274,317 | 12/1993 | Utley et al. | 318/798 |
| 5,382,853 | 1/1995 | Von Der Heide et al. | 310/67 R |
| 5,442,250 | 8/1995 | Stidsberg | 310/186 |
| 5,539,293 | 7/1996 | Randall et al. | 318/439 |

FOREIGN PATENT DOCUMENTS

| | | |
|---|---|---|
| 0 301 366 A2 | 2/1989 | European Pat. Off. . |
| 4009258A1 | 3/1989 | Germany . |
| WO 93/23911 | 5/1993 | WIPO . |

OTHER PUBLICATIONS

"Sensors: Improved Hall Devices Find New Uses: Orthogonal Coupling Yields Sensitive Products with Reduced Voltage Offsets and Low Draft," *ElectronicsWeek*, Apr. 1985 pp. 59–87.

"UGN–3040T/U and UGS–5–3040T/U Ultra–Sensitive Hall Effect Digital Switches", 3 pages.

Babico, "3–Phase Brushless DC Motor Using a Single Sensor", *Motorola Technical Developments*, 1989, 9, 56–57.

*Primary Examiner*—David Martin
*Attorney, Agent, or Firm*—Woodcock Washburn Kurtz Mackiewicz & Norris LLP

[57] ABSTRACT

A motor control system employing a single Hall sensor 2 providing a position feedback signal to a control circuit 10 is disclosed. The control circuit includes a tach counter circuit 12, a ramp mode circuit 14, an interpolation circuit 16, and a commutation logic circuit 18. Drive signals are output to the motor windings by the commutation logic circuit 18. The control state defining the drive signals is advanced on the basis of the estimated rotor position. The estimate of the rotor position is determined by linearly interpolating between Hall signal transitions.

3 Claims, 7 Drawing Sheets

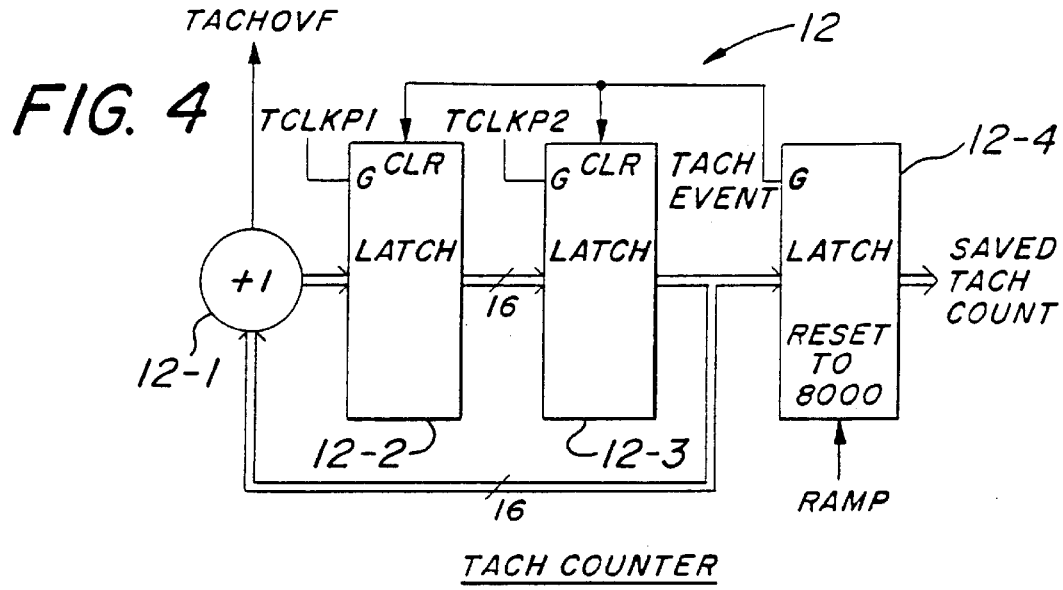
FIG. 4 — TACH COUNTER
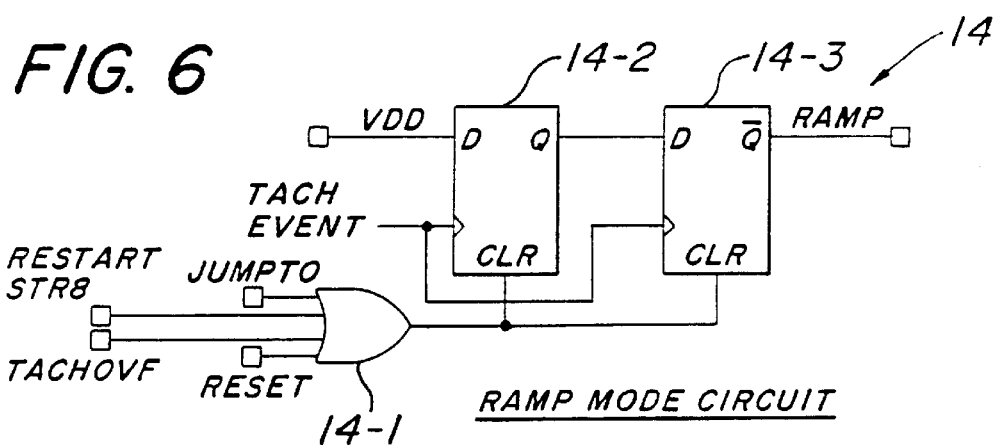
FIG. 6 — RAMP MODE CIRCUIT
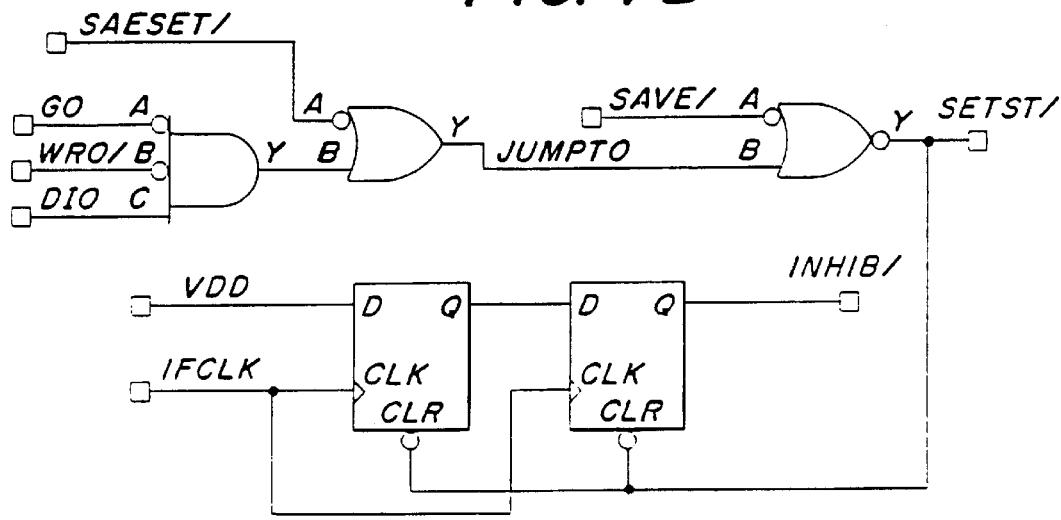
FIG. 7B

SERVO MOTOR CONTROLLER USING POSITION INTERPOLATION

This is a continuation of U.S. application Ser. No. 08/507,937 filed Jul. 27, 1995, now abandoned, which is a continuation of U.S. application Ser. No. 08/205,840 filed Mar. 3, 1994, now abandoned, the disclosure of which is herein incorporated by reference.

FIELD OF THE INVENTION

The present invention relates generally to the field of motor controllers and more particularly to a motor control method and apparatus requiring only one position sensor.

BACKGROUND OF THE INVENTION

A typical motor control scheme employs three Hall sensors 2 to provide position feedback to motor control circuitry, as illustrated in FIG. 1. This scheme is employed, e.g., in the TAPE250 tape drive available from Iomega Corporation, the assignee of the invention disclosed herein. Motor control signals, produced by control circuitry 4, are produced in one of six states, denoted A, B, C, D, E, and F, depending on the respective Hall sensor signals $H_1$, $H_2$, $H_3$. Each control signal state defines a particular combination of drive signals, denoted "PHASE A", "PHASE B", and "PHASE C" in FIG. 1. These drive signals drive windings on the stator 8. Each control signal state (or combination of drive signals) attracts the rotor magnets 6 to a specific stable physical position corresponding to that state. For example, if control state A were asserted and the rotor position permitted to stabilize, the rotor would reach a corresponding position "A".

The motor states are separated by a prescribed amount of angular rotation (e.g., 10 degrees). The three Hall sensor signals "$H_1$," "$H_2$," "$H_3$" provide information (feedback) about the rotor position. The Hall sensors 2 are aligned so that the sensor signals change state at the stable rotor positions A through F. As the motor control signals cycle through control states A through F, the three Hall signals "$H_1$," "$H_2$,"'"$H_3$" cycle through six position states, denoted 1 through 6, as follows (note that, although only six position states are used in this example, there are actually eight position states available with three sensors):

```
        Motor Control State
 --|A|B|C|D|E|F|A|B|C|D|E|F|--
 -1|2|3|4|5|6|1|2|3|4|5|6|1-
           Hall State
```

In the above diagram, the Hall state changes precisely at the static stable rotor position. Therefore, the midpoint of each Hall state is halfway between two static stable points and each static stable point is at the transition between two Hall states.

In the TAPE250 tape drive, the control logic operates as follows: If the Hall sensors are in state 1, control state B is asserted to advance the rotor towards state 2. Alternatively, to rotate the rotor in the opposite direction, control state E is asserted to move the rotor toward state 6. The Hall state indicates the rotor's position to within a range (e.g., 10 degrees). A control state is asserted corresponding to a static position leading 15 degrees from the approximate rotor position indicated by the Hall sensors. The following table indicates the control state asserted for each Hall state and the desired direction of rotation (note that, in this example, right is clockwise and left is counter-clockwise).

| Control for Desired Direction of Motion | | |
|---|---|---|
| Hall State | + (right) | − (left) |
| 1 | B | E |
| 2 | C | F |
| 3 | D | A |
| 4 | E | B |
| 5 | F | C |
| 6 | A | D |

In the highly competitive computer industry, the use of multiple sensors to provide positional feedback adds to the production cost of tape and disk drive units. While Hall sensors are relatively inexpensive on a per-unit basis, the requirement of multiple position sensors for each tape or disk drive can add hundreds of thousands or even millions of dollars to the manufacturer's total production costs, depending on the number of units produced. Thus, the need for multiple position feedback sensors is a disadvantage to manufacturers of tape drives, disk drives, and other devices requiring motor control.

SUMMARY OF THE INVENTION

The present invention provides methods and apparatus for controlling a motor using position feedback from only one sensor. In the exemplary embodiments disclosed herein, the one sensor comprises a Hall sensor positioned to sense the passage of rotating magnets associated with a rotor.

According to one presently preferred embodiment of the invention, a motor control method or system comprises the steps of or means for effecting rotation of a rotatable member toward a first rotational state (e.g., a state denoted (1); sensing, at a first instant of time, passage of the rotatable member through the first rotational state; effecting rotation of the rotatable member from the first rotational state (1) toward a second rotational state (2) by asserting a first control signal (B); determining, by interpolation, the time at which the rotatable member passes through the second rotational state (2); and effecting rotation of the rotatable member from the second rotational state (2) toward a third rotational state (3) by asserting a second control signal (C). In a preferred embodiment, the second control signal (C) leads the second rotational state (2) by a prescribed amount of angular rotation (e.g., 15 degrees). Preferred embodiments also include the step of asserting a third control signal lagging the third rotational state (3) by a prescribed amount of angular rotation. This provides controlled braking. Furthermore, preferred embodiments comprise the steps of sensing, at a second instant of time, passage of the rotatable member through a fourth rotational state (4); and asserting a third control signal (E).

In addition, in preferred embodiments, the sensing of the passage of the rotatable member through the first rotational state is performed by sensing a transition of a sensor output from a first state to a second state. For example, in such embodiments the rotatable member comprises a plurality of magnets and the sensor output is provided by a Hall sensor positioned to sense the passage of the rotating magnets.

According to another embodiment of the invention, a method or system for controlling the movement of one or more movable members of a motor comprises the steps of, or means for detecting, with a sensor at a first instant of time, the presence of a moving member at a prescribed position; and estimating the position of the moving member at a time subsequent to the first instant, the estimating performed on the basis of an output signal of the sensor. In presently preferred embodiments, the estimating of the position of the moving member comprises interpolating estimates of the position of the moving member on the basis of the sensor output taken at at least two instants of time. Other features of the present invention are described below.

BRIEF DESCRIPTION OF THE DRAWINGS

FIG. 4 depicts further details of the tach counter circuit 12.

FIG. 6 depicts further details of the ramp mode circuit 14.

FIGS. 7A, 7B, and 7C depict details of the commutation logic 18. FIG. 7A depicts combinational logic for providing active braking; FIG. 7B depicts circuitry preventing overlap between sourcing and sinking of a motor winding; and FIG. 7C depicts circuitry providing source and sink current to and from motor winding.

FIG. 8A is a plot for a three-hall sensor motor drive circuit connected to a randomly chosen drive motor. FIG. 8B is a plot for the same motor under identical test conditions driven by a single hall sensor circuit in accordance with the present invention.

DETAILED DESCRIPTION OF PREFERRED EMBODIMENTS

Figure 1:
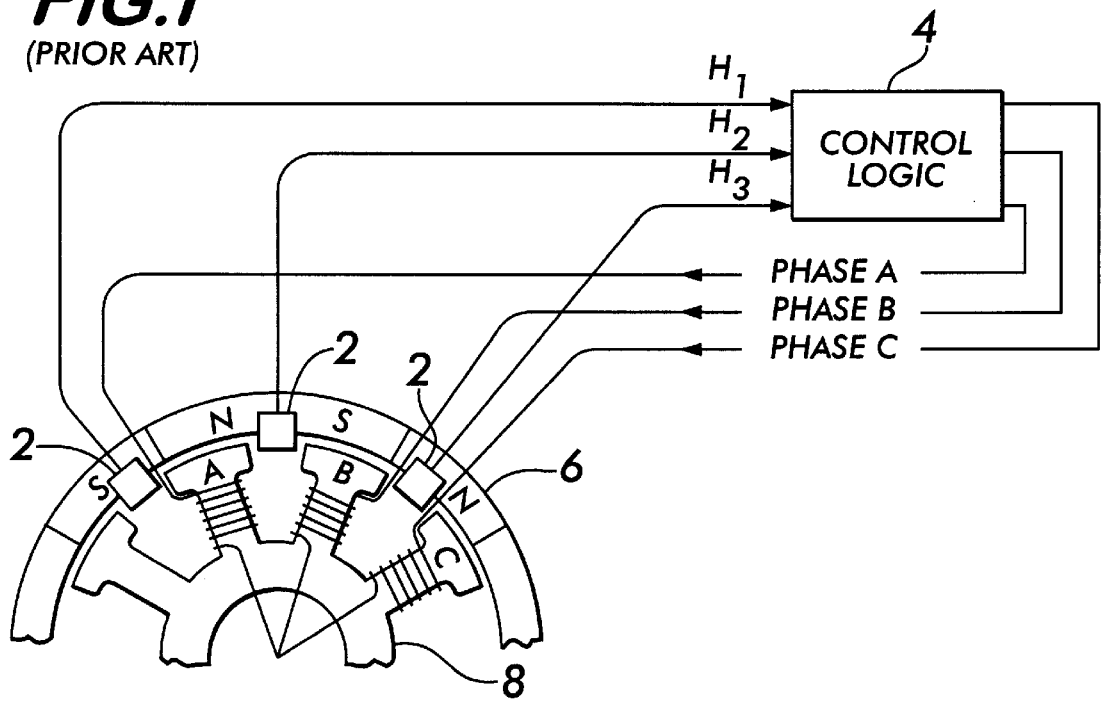
FIG. 1 schematically depicts a prior art motor control scheme employing three Hall position sensors.

In the single feedback sensor motor control scheme of the present invention, there is incomplete rotor position information, as indicated by the following diagram, where states 1–3 and 4–6 have become indistinguishable from each other. Thus, states 1–3 are denoted state "1" and states 4–6 are denoted state "4".

```
           Control State
--|A|B|C|D|E|F|A|B|C|D|E|F|--
 -1|1|1|4|4|4|1|1|1|4|4|4|1-
            Hall State
```

According to the present invention, the control state is advanced on the basis of the estimated rotor position. The estimate of the rotor position may be determined by linearly interpolating between Hall signal transitions. The control state is advanced to maintain a prescribed lead (e.g., 15 degrees) ahead of the rotor position, as described above in connection with the three Hall sensor motor control scheme.

For example, if the rotor is travelling to the right, or rotating clockwise, and the Hall state changes from 1 to 4, the rotor will be at the position corresponding to control state C (i.e., the stable position corresponding to control state C). Control state E would then be asserted, leading the rotor position by 15 degrees. Thereafter, assuming the rotor is rotating at a constant speed, the controller would wait for the rotor to advance one state and then assert control state F. After an identical delay, control state A would be asserted. The next change of control state from A to B would be effected when the Hall state changes from state 4 to state 1. Using this scheme, each Hall state transition causes the control state to "snap-to" a specific state, based upon the new Hall state and the desired direction of rotation. This is illustrated by the following table.

| | Snap-To State Table Desired Direction of Motion | | |
|---|---|---|---|
| | | + (right) | – (left) |
| Hall State | 1 | B | A |
| | 4 | E | D |

Initialization, Jump-To and Ramp

If an arbitrary motor control state is asserted, the motor may jump as far as 30 degrees in either direction. If the motor is by chance exactly midway between the two nearest stable points for the control state asserted (e.g., if control state A is asserted when the rotor is at D), the motor may stay at this metastable point for an indefinite period of time, until thermal noise or system vibration causes it to move, or "jump," in the wrong direction, achieving maximum velocity (in the wrong direction) at exactly the time the controller begins to ramp the motor up to speed. This initial motor jump can cause Hall sensor transitions that are quite similar to those produced by normal forward motion. As a consequence of these sensor transitions, the control signals may cycle too fast for the motor to follow, causing the motor to stop and vibrate, producing no sensor transitions or producing transitions at an implausible rate. Stable failure modes involving reverse motion would require that the motor travel at least five times the specified forward speed for a constant control sequence rate. Such a failure mode is unlikely or impossible due to the high acceleration and speeds required, and is detectable by observing the frequency of Hall signal transitions.

If the initial motor control is set based upon the Hall position state, the jump can be limited to 10 degrees backwards or 20 degrees forwards. Settling time can also be limited and Hall effect transitions during this initial "Jump-To" can be prevented or reduced. The following "Jump-To" table illustrates a way to set the initial motor control state to limit travel. This is the same table as the above Snap-To state table. Thus, by choosing this Jump-To table, the same hardware can be used to perform both the Snap-To and Jump-To functions.

| | Jump-To State Table Desired Direction of Motion | | |
|---|---|---|---|
| | | + (right) | – (left) |
| Hall State | 1 | B | A |
| | 4 | E | D |

An alternative to the above table is the below alternative Jump-To state table, which allows up to 30 degrees of jump in the forward direction but completely eliminates the initial jump in the reverse direction (except for a jump caused by motor or sensor misalignment).

| | Alternative Jump-To State Table Desired Direction of Motion | |
|---|---|---|
| | + (right) | - (left) |
| Hall State  1 | C | F |
| 4 | F | C |

After the initial jump and stabilization, it is possible to operate the motor in an open loop manner, like a stepper motor. Stepping through all states at a low speed will produce a high detent torque, even if the motor is "frozen" in a poor position relative to the Jump-To state. Once the motor has reached a sufficient speed, the Hall effect sensor will provide phase information. By interpolating between Hall signal transitions, the Control Sate can be changed with as much precision as when using three Hall sensors.

A reliable technique for ramping the motor to a certain speed is as follows: Ramping is performed automatically, with an initial start speed of 7 msec/commutation. Ramp problems are detected (e.g., by sensor transition timer overflow, or by firmware noticing transitions at an unreasonably high frequency and writing a "RESTART" strobe) and cause restart at an initial start speed (e.g., 7 msec/ commutation). The motor control logic remains at this initial speed until two consecutive sensor transitions are received without a counter overflow, at which point control is assumed by the interpolation circuit. The measured interval between the consecutive transitions is then used by the interpolation circuit to change the motor control state.

Coast and Brake

The motor may be allowed to coast to a stop but this may take longer than desired. To provide stronger braking action, all motor windings can be shorted to ground, thereby using the back-emf generated by the motor as a source of braking force. Another way to provide powered braking action is to modify the Snap-To logic so that the motor control state lags the rotor position instead of leading the rotor position. With the motor control system described herein, this phase shift may be realized by inverting the Hall sensor input to the Snap-To logic.

Torque Ripple

In the ten degrees of angular rotation wherein a control state is asserted, one can expect the motor torque to change with the changing angle between the rotor and the center position of the control state. If a single control state were permanently asserted, and the rotor were rotated by hand, one would see force rise and fall like a sine wave. The period of this sine wave would be 60 degrees of angular revolution. A plot of the torque produced by the six control states versus rotor position would yield six overlapping sine waves. If the sensor were perfectly aligned, the controller would advance to the next state at that angle where the next state begins to deliver more torque than the current state. At this point, torque would be reduced to cosine(30 deg)=87% of the maximum torque achieved at the centerpoint for the control state. A sophisticated interpolating control system with perfect sensor alignment could interpolate between sensor transitions to calculate nearly exact rotor position, and adjust or modulate motor current to provide more uniform torque.

Figure 2:
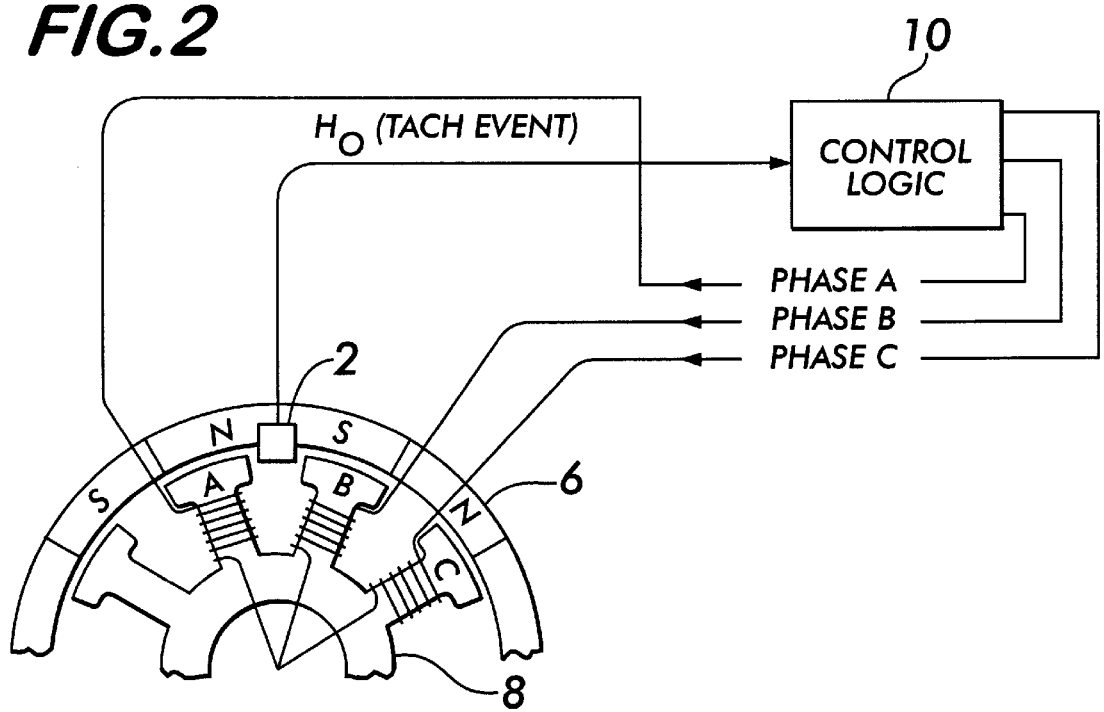
FIG. 2 schematically depicts a motor control scheme employing a single position feedback device in accordance with the present invention.

Referring now to FIG. 2, one example of a motor control system in accordance with the present invention comprises a single Hall sensor 2 providing a feedback signal "H$_0$," also referred to herein as a "TACH EVENT" signal, to a control circuit 10. The control circuit 10 outputs drive signals to the stator windings, A, B, C. The control circuit 10 will now be described in greater detail with reference to FIGS. 3 through 7C.

Figure 3:
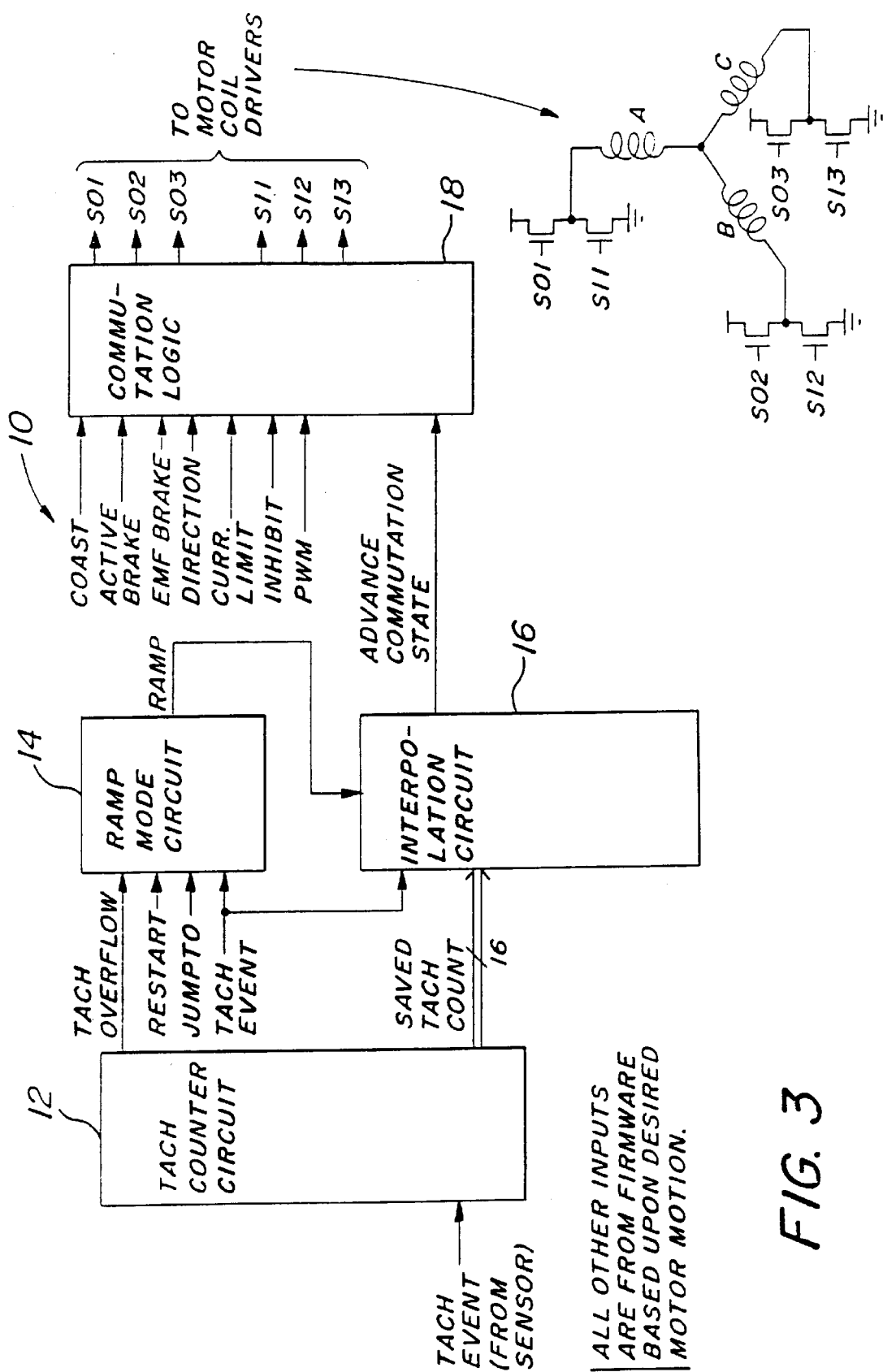
FIG. 3 is a block diagram of a control circuit 10 in accordance with the present invention.

FIG. 3 is a block diagram of a preferred embodiment of the control logic block 10. As shown, the control circuit includes a tach counter circuit 12, a ramp mode circuit 14, an interpolation circuit 16, and a commutation logic circuit 18. Drive signals are output to the motor windings by the commutation logic circuit 18. In addition, there are a variety of signals passed between the respective blocks of the control circuit 10. The functions of these signals are summarized in the following table:

| "TACH EVENT" | indicates Hall sensor transition |
|---|---|
| "TACH OVERFLOW" | indicates overflow of tach counter |
| "RESTART" | initiates automatic restart |
| "JUMPTO" | causes control state to jump to a specified state |
| "SAVED TACH COUNT" | indicates time between last two tach events |
| "RAMP" | instructs system to go into ramp mode |
| "COAST" | causes rotor to coast to stop |
| "ACTIVE BRAKE" | provides forced braking |
| "EMF-BRAKE" | instruct system to use back EMF for braking |
| "DIRECTION" | clockwise or counterclockwise rotation |
| "CURRENT LIMIT" | causes motor to stop if stuck, resulting in over current condition |
| "INHIBIT" | Prevents overlap between sourcing and sinking a motor winding when a control state is changing. |
| "PWM" | Motor force controlled by PWM signal's duty cycle |
| "S01", "S11" | drive signals for phase A |
| "S02", "S12" | drive signals for phase B |
| "S03", "S13" | drive signals for phase C |

The tach counter circuit 12, ramp mode circuit 14, interpolation circuit 16, and commutation logic circuit 18 will now be described in greater detail with reference to FIGS. 4, 5, 6, and 7A–7C, respectively.

Referring to FIG. 4, one presently preferred embodiment of the tach counter circuit 12 includes an adder 12-1 and first, second and third latches 12-2, 12-3, 12-4. Latch 12-4 receives the "TACH EVENT" signal from the Hall sensor 2 (FIG. 2) and also receives the "RAMP" signal from the ramp mode circuit 14. This latch outputs the saved tach count to the interpolation circuit 16. The adder 12-1 outputs a tach overflow, denoted "TACHOVF," to the ramp mode circuit 14. Thus, the tach counter circuit 12 saves a 16-bit number representing the time interval between the last two tach events, i.e., the last two transitions of the signal output by the Hall sensor. This value indicates how fast the rotor is spinning. As the rotor speed increases, a smaller interval elapses between Hall effect feedback transitions. Further, as the motor slows, the saved value will increase. If the motor were to stop or stall, the interval between feedback transitions would become so large that the 16-bit counter would overflow. Such an overflow is used by the ramp mode circuit 14 as one indication of a stall condition.

Figure 5:
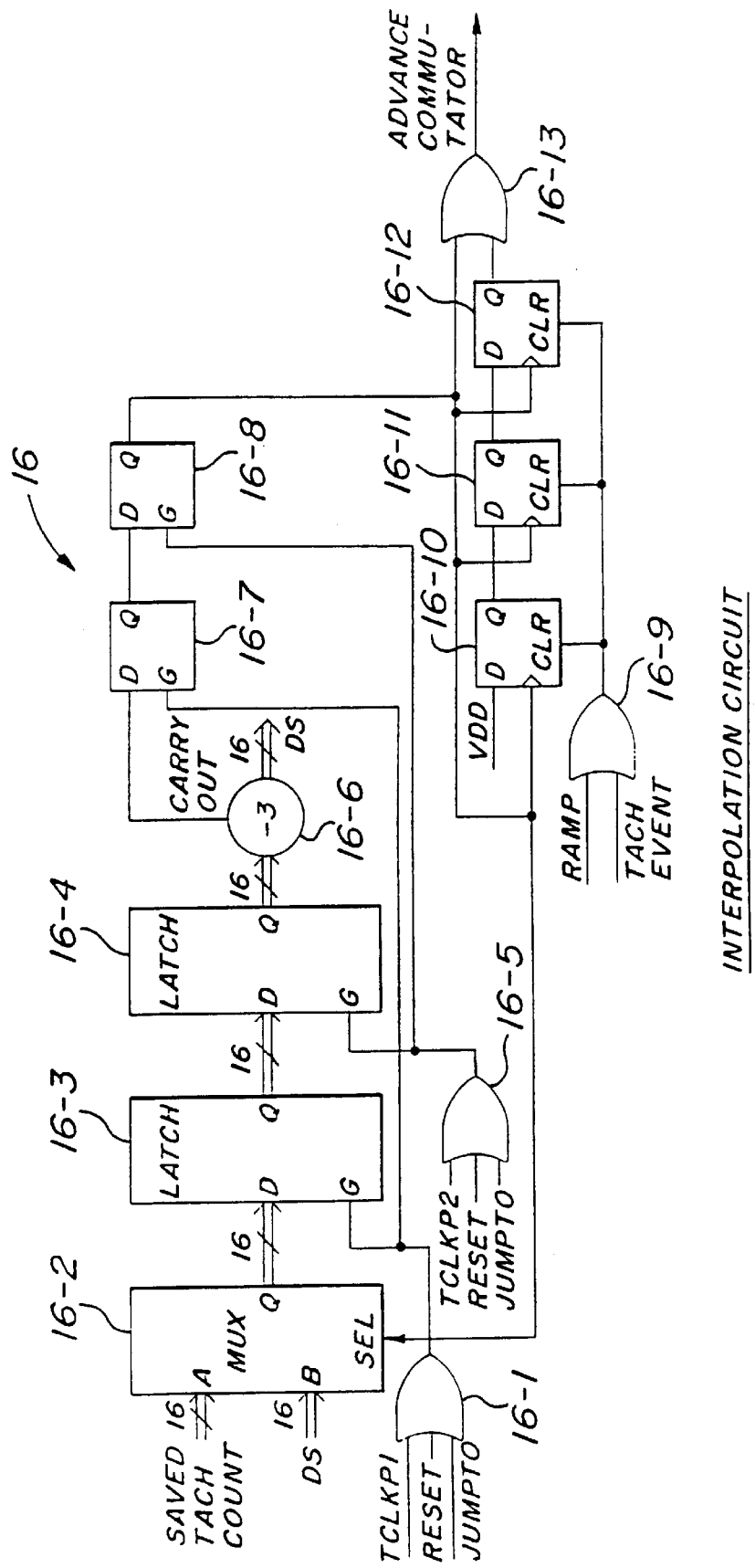
FIG. 5 depicts further details of the interpolation circuit 16.

Referring to FIG. 5, one presently preferred embodiment of the interpolation circuit 16 includes an OR gate 16-1; a multiplexor (or "mux") 16-2; first and second latches 16-3, 16-4; a second OR gate 16-5; an incrementor 16-6 (with an increment amount of minus three (−3)); flip-flops 16-7 and 16-8; another OR gate 16-9; flip-flops 16-10, 16-11, and 16-12; and another OR gate 16-13. The OR gates 16-9 and 16-13 in combination with flip-flops 16-10, 16-11, 16-12 operate to prevent the interpolation circuit from "guessing" when an accurate tach event (Hall transition) is due, except in ramp mode. (That is, there is an accurate synchronization edge every third Hall transition. The OR gates 16-9, 16-13 and flip-flops 16-10, 16-11, 16-12 prevent the interpolation circuit from interpolating a transition when an accurate transition is available. In ramp mode, the control state is advanced by loading a constant value into latch 12-4 (FIG. 4).) The multiplexer 16-2 receives the saved tach count from the tach counter circuit 12. The interpolation circuit 16 uses linear interpolation to advance the commutator twice for each tach event. A frequency divider circuit produces the signal to advance the commutation state. The frequency divider includes the counter 16-6 initialized to the value saved by the tach counter circuit. The counter decrements by 3 each system clock. When the counter counts down to 0, the commutation state is advanced. This is an incremental divide-by-3 technique using repeated subtraction. An additional circuit limits the commutation state to advance twice for each tach event. This prevents the interpolator from "guessing" when in fact a more accurate tach event is due.

When the system is in ramp mode, the interpolation circuit advances the commutation state at a constant frequency corresponding to a very slow tape speed. Tach events and the value saved by the tach counter are disregarded by the circuits 12 and 16.

Referring to FIG. 6, one presently preferred embodiment of the ramp mode circuit 14 includes an OR gate 14-1 and first and second flip-flops 14-2, 14-3. The OR gate 14-1 receives a "JUMP-TO" signal, a "RESTART" strobe, a "TACHOVF" (tach overflow) signal, and a "RESET" signal. Both of the flip-flops are gated by the "TACH EVENT" signal. The second flip-flop outputs the "RAMP" signal to the interpolation circuit 16. The ramp mode circuit 14 puts the system in ramp mode under the following conditions: on system reset; when the tach counter overflows, indicating a stall condition; when the motor is activated; or when an abnormally short tach count is detected, which also indicates a stall condition. Ramp mode is deactivated after two tach events without a tach overflow or one of the other conditions listed above.

The commutation logic circuit 18 is a combinational logic circuit that determines the current to the motor coils, based upon the internally guessed rotor position, the desired direction of motion, the desired speed, the current limit input, and whether the system is in "GO," "COAST," "EMF-BRAKE," or "ACTIVE-BRAKE" mode. In "GO" mode, the coils are magnetized in such a manner as to attract the rotor to a steady-state position that is, on average, physically 15 degrees ahead of the estimated rotor position. The expression "steady-state position" refers to the position at which the rotor would come to rest if the coil magnetization state were never changed. When the rotor advances to a point where the control circuit estimates that it is only 10 degrees behind the steady-state attraction position, the interpolation circuit 16 signals the commutation logic circuit 18 to advance the internal position estimate, causing the coil magnetization to change so that the new steady-state position is 20 degrees ahead of the estimated position. Because of the continuing advance of the control position, the control position will lead the rotor position by an average of 15 degrees. In ACTIVE-BRAKE mode the steady-state position lags the estimated position by 15 degrees, thereby providing force in the direction opposite to the direction of motor rotation.

Figure 7A:
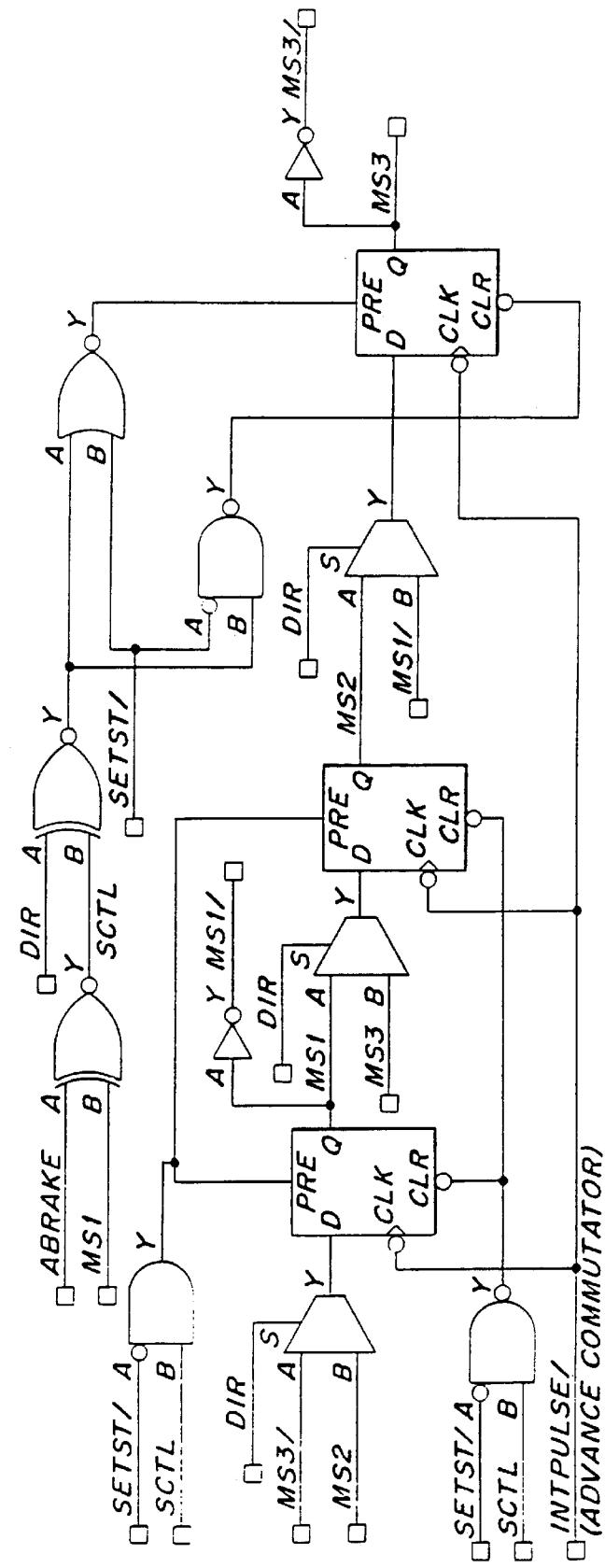
Figure 7C:
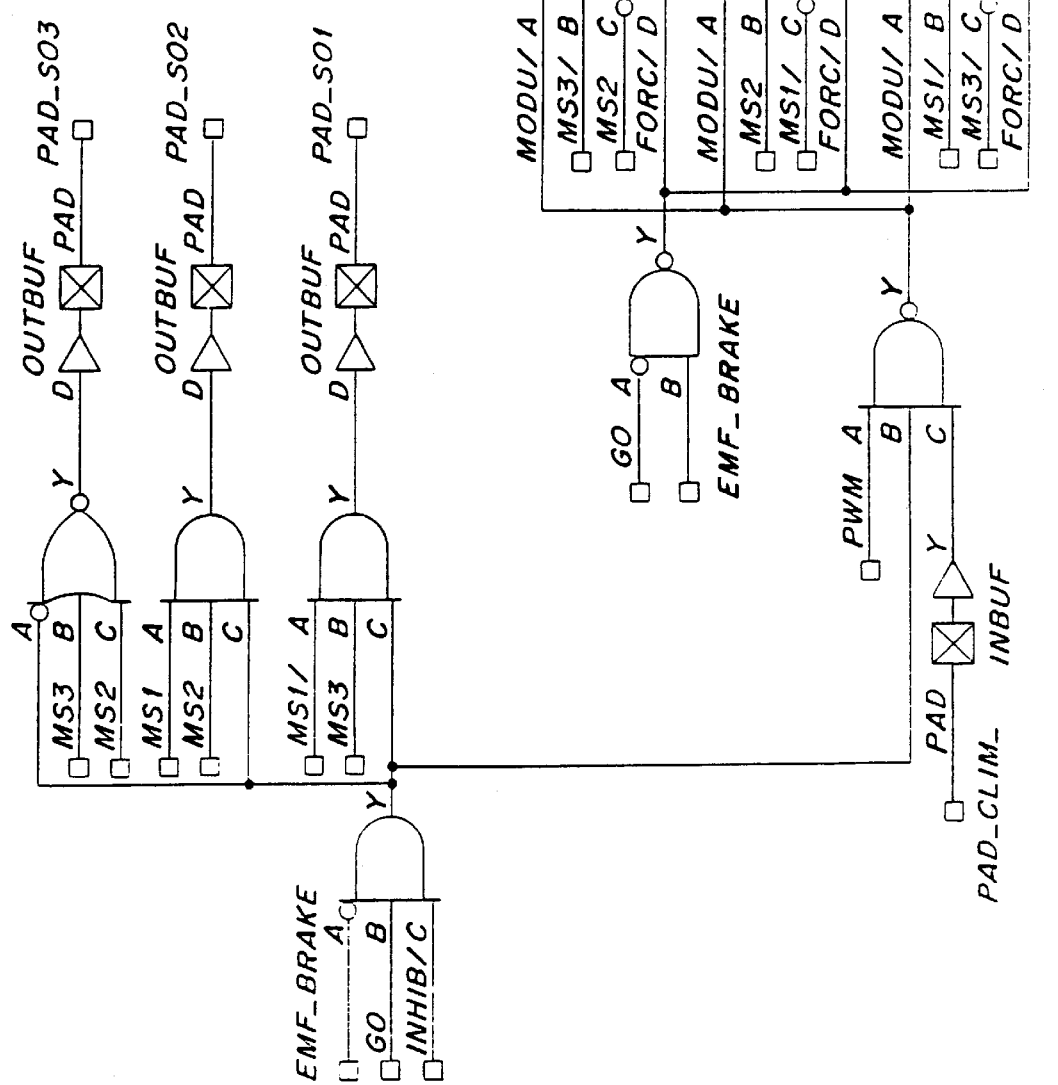

One presently preferred embodiment of the commutation logic circuit 18 comprises the circuitry depicted in FIGS. 7A, 7B, and 7C. The operation of this circuitry will be apparent to those skilled in the art after reading the foregoing specification. However, each of the circuits depicted in FIGS. 7A through 7C are briefly described below.

The three D-flip flop devices in FIG. 7A hold the current commutation state. Each time they are clocked the commutation state advances or reverses as selected by the direction control (using the three multiplexers). The "SETST/" control signal is asserted to implement either SNAP-TO (at sensor transitions) or choosing the snap-to and jump-to tables described earlier, both operations can be implemented using the same control logic. Asserting "SETST/" causes the control state D-flip flops to be preset or cleared to the values indicated by these tables. Additional inputs required by this control logic are the sensor state and the direction and active brake controls which determine whether the forced state leads or lags the state indicated by the sensor value.

In FIG. 7B, the three-input AND gate detects the situation where the motor is being started and produces the "JUMPTO" control signal going to the logic described above. The OR gate asserts the "SETST/" control whenever the control state is to be forced as described above. If the sensor were to change state out of sequence (e.g., due to some unexpected motor acceleration, or mechanical oscillation during ramp), this could cause a control state change where the current in a coil immediately reverses direction. During the switching interval, both the source and sink transistors to this coil would be active, resulting in a short circuit from power to ground through these two transistors.

The two flip flops in FIG. 7B assert "INHIB/" control briefly each time the control state is forced by the "SETST/" control. The "INHIB/" signal then interrupts the current to the coils. This is used as a safety control to prevent this momentary short circuit.

The combinational logic in FIG. 7C translates the motor control state into forward or reverse current through one of the three motor coils. The outputs of this circuit are signals "SO1", "SO2", "SO3", "S11/", "S12/", "S13/", which respectively source and sink current to motor windings 1, 2 and 3.

Other controls are implemented as follows by this logic. The "EMF-BRAKE" control causes all coils to be grounded. Either the "CLIM/" or "PWM" controls will activate "MODU/", modulating current to the motor by deactivating the sink current drivers. The "COAST" signal is not shown under that name. To obtain COAST mode, the GO signal is deactivated, which in turn deactivates all current to the motor.

Figure 8A:
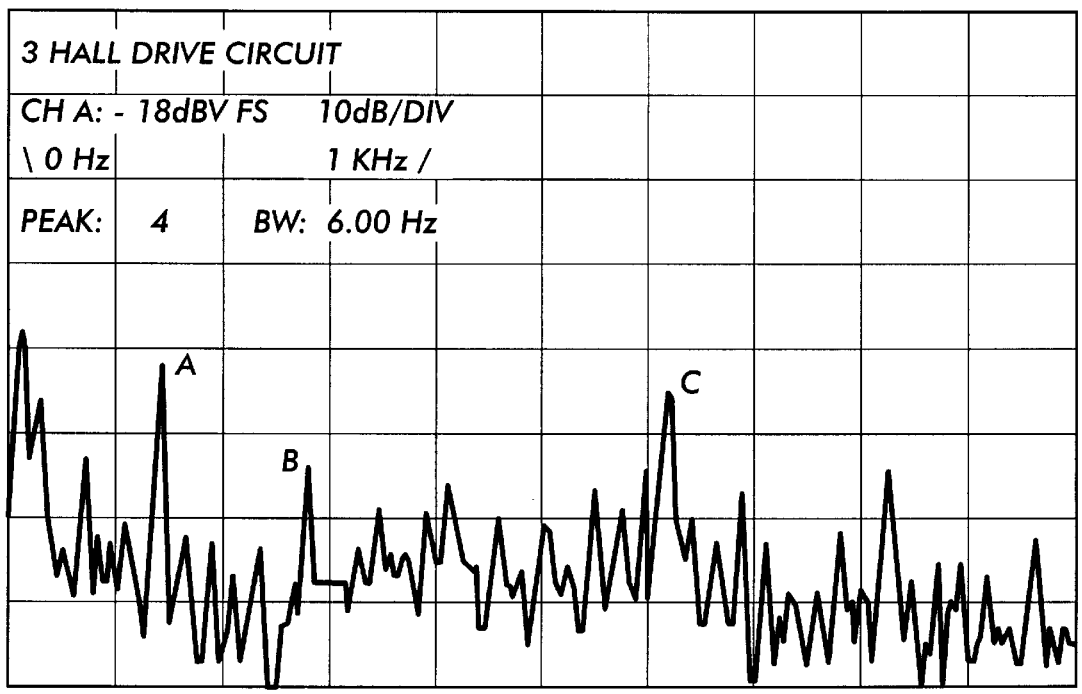
FIGS. 8A and 8B are two spectrum plots from a motor tester showing relative levels of instantaneous speed variation (ISV).
Figure 8B:
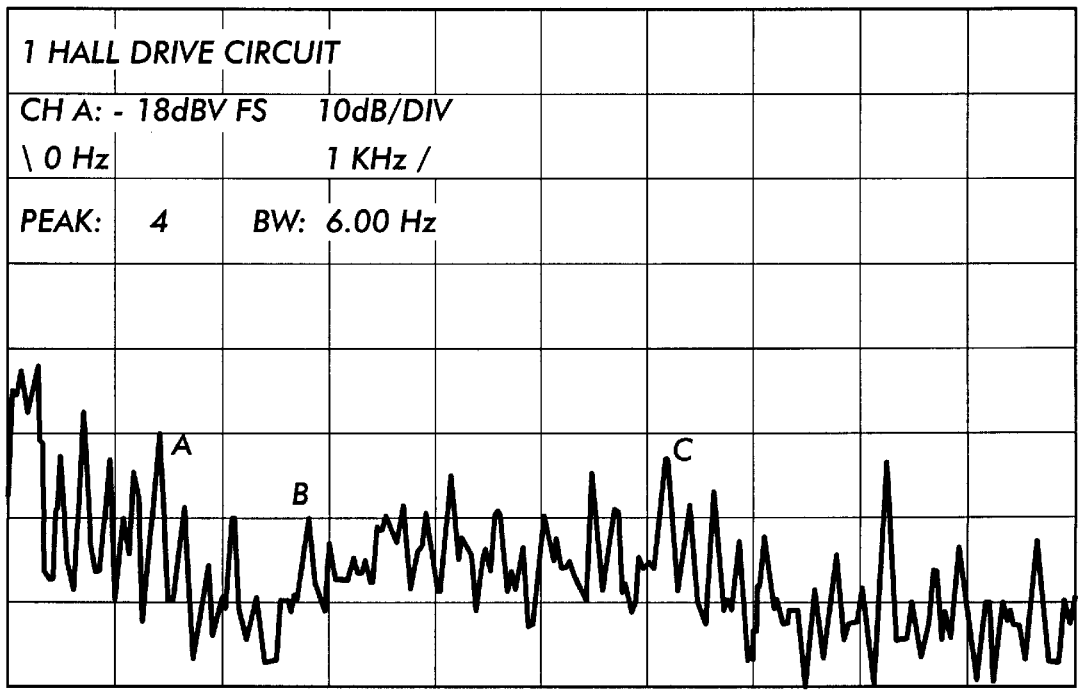

The present invention has demonstrated unexpectedly good results, as evidenced by a comparison of FIGS. 8A and 8B. As mentioned above, FIG. 8A is a plot of the instantaneous speed variation (ISV) of a motor driven by a three-hall sensor drive circuit of the prior art. FIG. 8B is a plot of the ISV of the same motor driven by a single hall sensor control circuit in accordance with the present invention. As depicted by these plots, the three ISV peaks, A, B, C show a reduction of 8, 6, and 9 dBV, respectively. Those skilled in the art recognize that ISV is a very important criteria in many applications. For example, ISV is very important for a tape drive motor because excessive ISV may prevent successful recovery of recorded data.

Finally, although presently preferred embodiments of the invention are described in detail herein, it should be noted that the true scope of the invention is not limited to the disclosed embodiments. For example, the inventive motor control method may be employed in connection with electrical motors which are not three-phase motors. Accordingly, except as they may be expressly so limited, the scope of protection of the following claims is not intended to be restricted to the details of the disclosed embodiments.

We claim:

1. A motor control method for controlling the rotation of a magnetic rotor of a multi-phase motor, said motor comprising said rotor and a stator having at least three phases, said rotor being magnetically coupled to and movable by said stator when said phases of said stator are appropriately energized. comprising the steps of:

(a) effecting rotation of said rotor toward a first rotational position;

(b) sensing, at a first instant of time, passage of the rotor through said first rotational position, wherein said sensing is performed on the basis of a single output signal of a position sensor positioned adjacent said rotor;

(c) effecting rotation of the rotor from said first rotational position toward a second rotational position by generating a first control signal and energizing said stator in accordance with said first control signal;

(d) determining, by interpolation, the time at which the rotor passes through said second rotational position; and (e) effecting rotation of the rotor from said second rotational position toward a third rotational position by generating a second control signal and energizing said stator in accordance with said second control signal; and further comprising the step of generating a third control signal lagging said third rotational position by a prescribed amount of angular rotation, whereby braking is provided.

2. A motor control method for controlling the rotation of a magnetic rotor of a multi-phase motor, said motor comprising said rotor and a stator having at least three phases, said rotor being magnetically coupled to and movable by said stator when said phases of said stator are appropriately energized, comprising the steps of:

(a) effecting rotation of said rotor toward a first rotational position;

(b) sensing, at a first instant of time, passage of the rotor through said first rotational position, wherein said sensing is performed on the basis of a single output signal of a position sensor positioned adjacent said rotor;

(c) effecting rotation of the rotor from said first rotational position toward a second rotational position by generating a first control signal and energizing said stator in accordance with said first control signal;

(d) determining, by interpolation, the time at which the rotor passes through said second rotational position; and (e) effecting rotation of the rotor from said second rotational position toward a third rotational position by generating a second control signal and energizing said stator in accordance with said second control signal; and further comprising ramping the motor speed to a specified level by performing the following steps:

(1) setting an initial motor speed and operating said motor at said initial speed;

(2) monitoring said motor for a stall condition by comparing the frequency of transitions of a sensor signal with a prescribed range, wherein a stall condition is indicated when the frequency is outside said prescribed range; and (3) if a stall condition is detected, restarting said motor at a prescribed speed; or (4) if a stall condition is not detected, increasing the motor speed.

3. A motor control system for controlling the rotation of a magnetic rotor of a multi-phase motor, said motor comprising said rotor and a stator having at least three phases, said rotor being magnetically coupled to and movable by said stator when said phases of said stator are appropriately energized, comprising:

(a) a single sensor positioned adjacent said rotor to sense the passage of a magnetic portion thereof; and (b) a control circuit coupled to said sensor and providing control signals to windings of said stator, said control signals controlling the rotation of said rotor, said control circuit comprising means for effecting rotation of said rotor toward a first rotational position; means for determining, via a single output of said sensor at a first instant of time, passage of the rotor through said first rotational position; means for effecting rotation of the rotor from said first rotational position toward a second rotational position by generating a first control signal; means for determining, by interpolation, the time at which the rotor passes through said second rotational position; and means for effecting rotation of the rotor from said second rotational position toward a third rotational position by generating a second control signal; and further comprising means for generating a third control signal lagging said third rotational position by a prescribed amount of angular rotation, whereby braking is provided.

* * * * *